United States Patent
Augusteijn et al.

(10) Patent No.: US 6,282,708 B1
(45) Date of Patent: Aug. 28, 2001

(54) METHOD AND PROCESSOR FOR STRUCTURING A MULTI-INSTRUCTION COMPUTER PROGRAM IN AN INTERNAL DIRECTED ACYCLIC GRAPH

(75) Inventors: Alexander Augusteijn; Jan Hoogerbrugge, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/257,652

(22) Filed: Feb. 25, 1999

(30) Foreign Application Priority Data

Feb. 25, 1998 (EP) .................................................. 98200598

(51) Int. Cl.⁷ ............................... G06F 9/44; G06F 9/38; G06F 13/00
(52) U.S. Cl. .................................. 717/9; 712/24; 712/216
(58) Field of Search ............................... 716/4; 717/6, 9; 712/216, 24; 709/106

(56) References Cited

PUBLICATIONS

David A. Patterson & John L. Hennessy, Computer Architecture A Quantitative Approach, Morgan Kaufmann 1996, p. 240–288.

P.Y.T. Hsu and E.S. Davidson, Highly Concurrent Scalar Processing, Univ. of Illinois at Urbana–Champaign, Proc. 13th Ann. Int. Symp. on Computer Architecture, Jun. 1986, p. 386–395.

S. A. Mahlke et al, Effective Compiler Support or Predicated Execution Using the Hyperblock, Univ. of Illinois at Urbana–Champaign, Proc. 2th Ann. Int. Workshop on Microprogramming, Portland, OR, Dec. 1992, p. 45–54.

*Primary Examiner*—Daniel H. Pan
*Assistant Examiner*—Te Yu Chen

(57) ABSTRACT

A method for structuring a multi-instruction computer program as containing a plurality of basic blocks, that each compose from internal instructions and external jumps organised in an internal directed acyclic graph. A guarding is executed on successor instructions that each collectively emanate from a respectively associated single predecessor instruction. A subset of joined instructions that converge onto a single join/target instruction are then unconditionally joined. This is accomplished by letting each respective instruction in the subset of joined instructions be executed under mutually non-related conditions, specifying all operations with respect to a jump instruction, specifying all operations that must have been executed previously, and linking various basic blocks comprising subsets of successor instructions in a directed acyclic graph which allows parallel execution of any further subset of instructions contained therein.

5 Claims, 2 Drawing Sheets

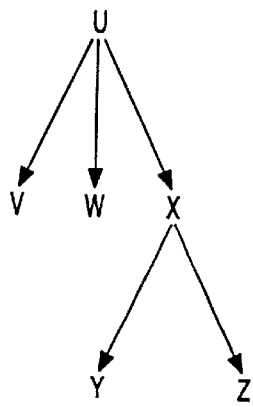
FIG. 3
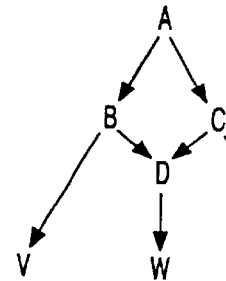
FIG. 4
```
IU
select
  v then
    IV
    B
  w then
    IW
    B
  x then
    IX
    select
      y then
        IY
        B
      z then
        IZ
        B
```
FIG. 5
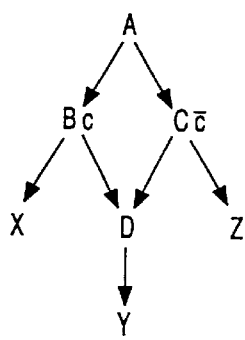
FIG. 6a
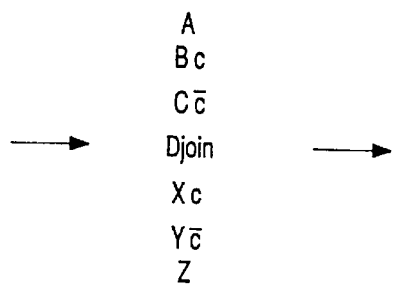
FIG. 6b
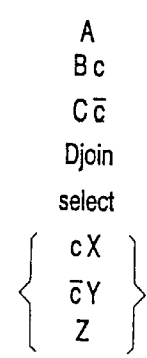
FIG. 6c

METHOD AND PROCESSOR FOR STRUCTURING A MULTI-INSTRUCTION COMPUTER PROGRAM IN AN INTERNAL DIRECTED ACYCLIC GRAPH

BACKGROUND OF THE INVENTION

The invention relates to a method for structuring a multi-instruction computer program as containing a plurality of basic blocks, that each compose from internal instructions and external jumps organized in an internal directed acyclic graph. Structuring such multi-instructional computer programs for faster execution is a continual target of industry. A particular feature is to enable parallel processing on the level of a single instruction, which has become feasible by the introductions of so-called Very Long Word Instruction (VLIW) processors and so-called SuperScalar processors. State of the art is the book by David A. Patterson & John L. Hennessy, Computer Architecture, a Quantitative Approach, Morgan Kaufmann 1996, p. 240–288, herein incorporated by reference. Patterson and Hennessy describes how VLIWs use multiple, independent functional unit which packages multiple operations into one long instruction. The parallelism in Superscalars may be attained in a program of which the scheduling is being executed at actual execution. Alternatively, in VLIW, the effects may be partially exploited by scheduling at compiling time. A general rule is that parallelism may be exploited better when a greater number of operations can be processed coexistently, given the available extent of hardware facilities. Such amount of operations will hereinafter be called a scheduling unit or basic block. In its most simple embodiment such a scheduling unit may be organized on a Directed Acyclic Graph (DAG) that consists of internal operations and one or more external (conditional) jumps to other scheduling units. The graph may be reached from one or more other graphs via respectively associated input operations, that read an initial value from an associated specific register. Likewise, output will also involve a write operation to a possibly selectible specific register.

P. Y. T. Hsu and E. S. Davidson, Highly Concurrent Scalar Processing, Univ. of Illinois at Urbana-Champaign, Proc. 13th Ann. Int. Symp. on Computer Architecture, June 1986, p.386–395, have proposed to expand the size of scheduling units by introducing guarded instructions to reduce the penalty of conditional branches, in combination with decision tree (dtree) scheduling.

Alternatively, S. A. Mahlke et al, Effective Compiler Support for Predicated Execution Using the Hyperblock, Univ. of Illinois at Urbana-Champaign, Proc. 25th Ann. Int. Workshop on Microprogramming, Portland OR Dec. 1992, p.45–54, have mapped their basic blocks on a linear chain of basic blocks by duplicating basic blocks, so that each internal basic block has only a single predecessor.

However, the present inventors have found that in many cases the above guarding may be amended as well as amplified to attain an improved degree of parallelism, by mapping a Directed Acyclic Graph of basic blocks on a single higher level basic block for inclusion in a higher level tree of higher level basic blocks.

SUMMARY TO THE INVENTION

In consequence, amongst other things, it is an object of the present invention to introduce a combination of guarding and joining in a decision tree to link multiple basic blocks into a single higher level basic block. Now therefore, according to one of its aspects the invention is characterized by executing a guarding on successor instructions that each collectively emanate from a respectively associated single predecessor instruction, all guardings being mutually exclusive with respect to their respectively associated basic block, unconditionally joining a subset of joined instructions that converge onto a single join/target instruction, by letting each respective instruction in the subset of joined instructions being executed under mutually non-related conditions, specifying all operations with respect to a jump instruction specifying all operations that must have been executed previously, and linking various basic blocks comprising subsets of successor instructions in a directed acyclic graph which allows parallel execution of any further subset of instructions contained therein and being usable as a single higher level basic block for inclusion in a higher level tree of higher level basic blocks.

Advantageously, a method according to the invention implements one or more conditional jumps between an overall predecessor non-jump instruction of the internal Directed Acyclic Graph, and displacing said external jump instruction towards a lower end of its chain. In this manner, both predecessors and jumps are combined in an advantageous method.

The invention also relates to a programmed processor attained by loading with a program produced by executing a method as claimed in claim 1. Further advantageous aspects of the invention are recited in dependent Claims. The invention may be applied to VLIW processors as explained supra, but also on so-called Superscalar processors, of which the commercially available Pentium Pro controller is a prime example.

BRIEF DESCRIPTION OF THE DRAWING

These and further aspects and advantages of the invention will be discussed more in detail hereinafter with reference to the disclosure of preferred embodiments, and in particular with reference to the appended Figures that show:

FIG. 3, a second exemplary control flow graph;

FIG. 4, a third exemplary control flow graph;

FIG. 5, a representation of a tree of DAGs;

FIGS. 6a–6c, a further tree.

DETAILED DESCRIPTION OF PREFERRED EMBODIMENTS

Figure 1:
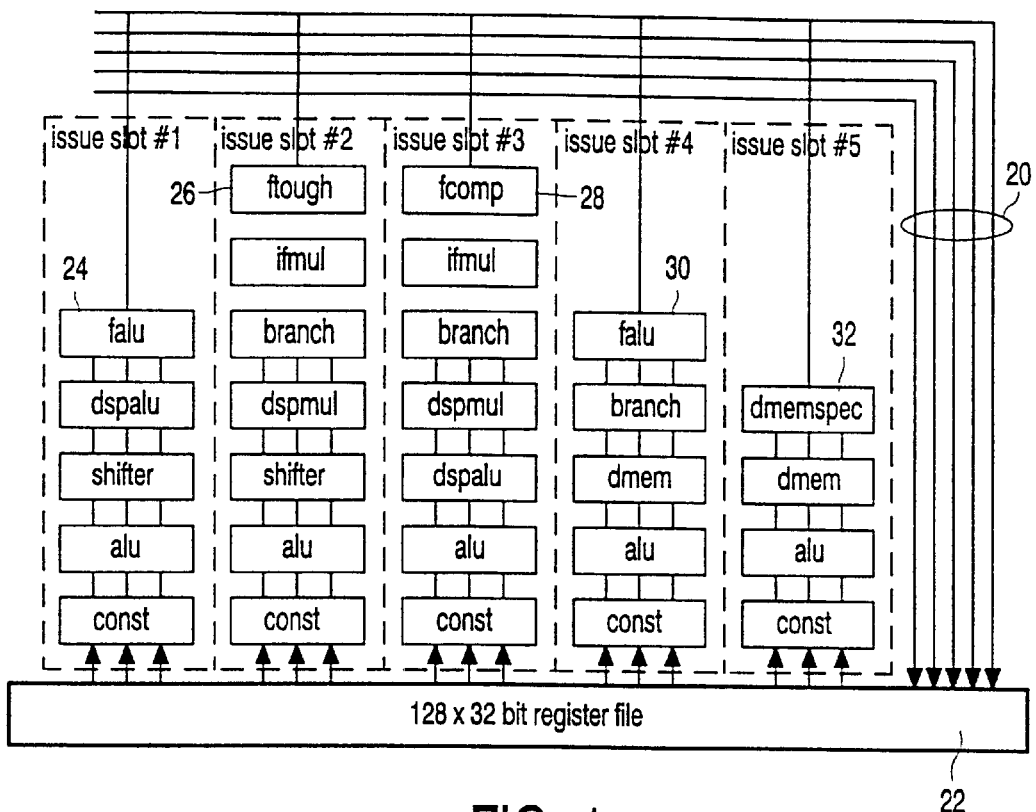
FIG. 1, an exemplary VLIW processor block diagram.

FIG. 1 is a block diagram of an exemplary VLIW processor. Backbone of the structure is multiple writeback bus 20 that feeds 128×32 bit register file 22. Processing capability is organized according to five parallel so-called issue slots 24–32 that each comprise a plurality of functional units. In each processor cycle each issue slot may start at most one of its functional units, and each issue slot may have at most one of its functional units produce an output on the bus. In another embodiment, each cycle may produce up to five results on the bus, irrespective of which issue slot does the actual producing. As far as applicable, the functional units themselves are internally fully pipelined. The various units operate to provide a constant, as an arithmetic and logic processing unit, a data memory, a data memory special, a shifter, a digital signal processing alu, a digital signal processing multiplier, a branch control unit, a floating point alu, an integer floating point multiplier, a floating point comparator, and a unit ftough for executing specific and complex operations such as floating point division and square root calculation. Each unit may receive operands and control signals as far as necessary. Synchronizing has not been shown.

The method of the invention bases on decision trees, wherein a decision tree is composed from basic blocks. Such a decision tree may be scheduled as a single unit when the processor supports guarded execution of instructions; scheduling of the basic blocks therein is then no longer necessary. Operations may be transferred between various basic blocks, such as when locally an insufficient amount of parallelism is available. The grammar of decision tree DT may be written as:

$$DT=IS(B| \text{ if } c \text{ then } DT' \text{ else } DT'')$$

Herein IS is an instruction sequence that is a Directed Acyclic Graph. The result of execution of the instruction sequence may be either a branch operation B, or the calculating of a condition c. No afterconstraint need be applied to the branch operation B, because it will always be clear which operations must precede B. The result of calculating condition c will indicate which other decision tree DT' or DT" must be started. The scheduler will now guard the operations in the "then" part with a guard c and in the "else" part with a guard c', that is the negation of c. The main disadvantage of the dtrees so defined is that only control flow splitting may be obtained, because a decision tree can contain such control splitting. On the other hand, in order to merge controls, a new decision tree must be implemented. Thereto, the invention introduces so-called guarded decision trees that will extend the scheduling unit from trees of basic blocks to trees of Directed Acyclic Graphs of basic blocks. This extends the potential scheduling scope to arbitrary non-cyclic regions of basic blocks. Note that a DAG of basic block instructions corresponds to the original. Jumps are the jumps of the old basic blocks, now guarded as appropriate in the new basic blocks.

Figure 2:
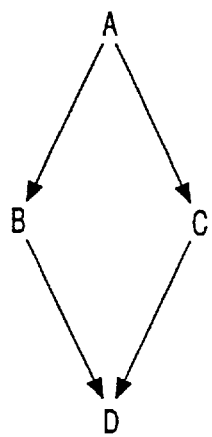
FIG. 2, a first exemplary control flow graph.

In this respect, FIG. 2 is a first exemplary control flow graph that contains four basic blocks A–D. Assume that A branches to B on condition c. Then the operations in A and D should be unguarded, whereas those in B and C should be guarded with c and c', respectively. In contrast with earlier procedures, instead of having the scheduler introduce guarding, this guarding will be implemented in the representation of the decision tree itself. In this manner, the arrangement ABCD is represented as a single Directed Acyclic Graph of instructions, of which a part is guarded. In principle, this solution may cause the calculating of an operand x in either B or C, with values i and j, respectively, whereas this operand will be used in D. Now, operand x will be represented by a pseudo operation 'join i j' which joins the values i and j computed by the respective operations. This particular join operation assumes that its arguments will be computed mutually exclusively. The scheduler, on the other hand, need not generate operations for executing the join, but may safely use a single register for storing either the value i or the value j, because the guarding will always disable one of the two: the register will receive only a single value.

Therefore, a DAG made up of basic blocks can be represented as a single Basic Block by introducing the necessary guarding and join operations.

According to the invention, these Directed Acyclic Graphs are in turn configured to a tree. In this way scheduling operations are allowed more flexibility, because the guarding may be introduced into the branches of the tree. Furthermore, each branch may be associated by the scheduler with an appropriate priority level. This would not be feasible when all control had been replaced by guarding up front.

FIG. 3 is a second exemplary control flow graph wherein all letters symbolize respective Directed Acyclic Graphs of basic blocks, that are represented as discussed supra. Note however, that the respective branches from U to V, W and X, need not all emanate from only a single basic block within U.

FIG. 4 is a third exemplary control flow graph, for illustrating the above non-uniformity. Herein, A, B, C, D are basic blocks, and U, V, W, X, Y, Z are directed acyclic graphs of basic blocks. Further, U is the Directed Acyclic Graph containing basic Blocks A, B, C, D. For example, the string IU of instructions contained in U may contain the stringed instructions IA, IB, IC, ID. Further, A may branch to B under condition a, B to V under condition b, and C to D under condition c. The conditions for U to branch to V, W, and X, will then be ab, ab'+a'c and a'c', respectively. Generally, this allows to calculate exit conditions from an arbitrary Directed Acyclic Graph in an easy manner. In similar manner, the trees shown in FIGS. 2, 3, 4 may have a plurality of entry points.

FIG. 5 gives a representation of a tree of DAGs. Herein, IU is the sequence of instructions from U, IV is the sequence of instructions from V, and so on. In this case, the branch towards V is only dependent on the instructions in A and B, but independent of the instructions in C and D. B is a branch that may feature an afterconstraint, which points to one or more instructions. The evaluation may be restricted to the instructions that generate the constraint in question. Other instructions need no consideration. The union of the conditions leading towards the join or target instruction of W may be incomplete, but no overlap between any of these conditions is allowed.

The grammar for this n-way exit in a tree may be extended as follows:

$$DT=IS(B| \text{ select of } c \text{ then } DT' \text{ else } DT'').$$

Herein, there is an n-fold choice among the various c that each allows a choice between associated DT', DT". Furthermore, herein B includes the constraints; and the tree has been shown in FIG. 5 indeed.

FIGS. 6a–6c illustrate a further tree. In FIG. 6a, the conditions for entering B and C are mutually opposites c and $\bar{c}$, respectively. In serie representation, this converts to the sequence of FIG. 6b. A still further variation is shown in FIG. 6c. Here, subsequent to the join, a select operation is present, thereby making the bracketed tail to be made up of after constructs.

Note that in all cases, A has only one exit point operative at any time although it could have more than the two outputs shown. The jump always contains an implicit assumption. If the jump is kept in the middle, it becomes an invalid basic block. a remedy is to shift the jump to the end of the sequence.

Various specific items are as follows:
- a Directed Acyclic Graph made up of blocks of instructions correspond to the original set-up. Jumps are now the guarded jumps of the old basic blocks. Together, these constitute a new basic block:
- a target instruction is generally also a join instruction;
- each guarding is 1:1 coupled to a single basic block.

What is claimed is:

1. A method for structuring a multi-instruction computer program as containing a plurality of basic blocks, that each compose from internal instructions and external jumps organized in an internal directed acyclic graph, comprising:

executing a guarding on successor instructions that each collectively emanate from a respectively associated single predecessor instruction, all guardings being mutually exclusive with respect to their respectively associated basic block, unconditionally joining a subset of joined instructions that converge onto a single join/target instruction, by letting each respective instruction in the subset of joined instructions being executed under mutually non-related conditions, specifying all operations with respect to a jump instruction specifying all operations that must have been executed previously, and linking various basic blocks comprising subsets of successor instructions in a directed acyclic graph which allows parallel execution of any further subset of instructions contained therein and being usable as a single higher level basic block for inclusion in a higher level tree of higher level basic blocks.

2. A method as claimed in claim 1, further comprising structuring such computer program in a tree of directed Acyclic Graphs.

3. A method as claimed in claim 1, further comprising implementing one or more conditional jumps between an overall predecessor non-jump instruction of the Directed Acyclic Graph in question, and displacing said external jump instruction towards a lower end of its chain.

4. A method as claimed in claim 1, further comprising allowing selection among various decision trees each comprising respective Directed Acyclic Graphs, under a set of mutually less than complementary conditions, thereby transforming a set of sequential jumps into a bigger jump.

5. A method as claimed in claim 1, further comprising a downward shift for a particular conditional jump, implementing a freedom-enhancing after-constraint with respect to its condition or conditions, as accommodating non-uniformity.

* * * * *